VIDEO CLIPPING CIRCUIT ADJUSTABLE BY DIGITAL FEEDBACK

Filed Jan. 30, 1964

INVENTOR
WILLIAM W. HARDIN
BY Ronald J. Clark
ATTORNEY

United States Patent Office 3,339,178
Patented Aug. 29, 1967

3,339,178

VIDEO CLIPPING CIRCUIT ADJUSTABLE BY DIGITAL FEEDBACK

William W. Hardin, Endicott, N.Y., assignor to International Business Machines Corporation, New York, N.Y., a corporation of New York Filed Jan. 30, 1964, Ser. No. 341,274
10 Claims. (Cl. 340—146.3)

This invention relates to adjustable video clipping circuits, and more particularly to an improved video clipping circuit which adjusts its clipping level in response to prior logical decisions.

Generally, clipping circuits are employed to facilitate the separation of data signals from unwanted background noise or other interfering signals. Fixed level clipping circuits operate satisfactorily in the absence of sizable background noise or with constant amplitude data signals. However, the combination of spurious background noise and data signals of varying levels requires a clipping circuit having an adjustable clipping level, which level fluctuates with the background signals and with its data signals. The clipping circuit distinguishes the data signals from its other input signals and generates output signals representative of its input video data signals.

The versatility of an optical analyzing system is increased by its ability to recognize varying character-background contrasts. More specifically, the printing characteristics of characters may vary from one character to the next, or from one printed page to another. For example, clearness of edge definition and consistency of ink distribution is apt to vary during the printing of a character. Additionally, the color and texture of the paper upon which the characters are printed may fluctuate, thereby causing a reduction in character background contrast during an optical scanning operation. Therefore, in order to enlarge the dynamic recognition range of the character-background contrast of an optical character analyzing system, an additional feedback loop is added to its video clipping circuit to adjust its clipping level to reflect previous decision as to the black-white nature of the adjoining horizontal areas of the scanning operation. In this manner, the clipping level for a particular scanning area is raised if the adjacent horizontal scanning areas contained a black signal or what is part of a written character. Conversely, if the decision signals for the adjacent horizontal areas indicate a white or background signal, the clipping level is lowered in order to sense all possible black signals however weak because of a low character-background contrast.

Additionally, it is possible to employ more extensive delay line circuits and utilize future black-white decisions to adjust the clipping level.

Existing clipping circuits employ delaying techniques to adjust the clipping level of a video signal according to the average video signal surrounding the signal being clipped. Such a circuit is described by E. C. Greanias in his U.S. Patent 2,975,371, entitled "Clipping Level Control Circuit." However, there are limitations as to this type of circuit which reduce its range of adjustment according to the criteria of immediately surrounding video signals. Therefore, the instant invention is employed to correct the inadequacies of such a clipping circuit.

It is an object of the present invention to provide an improved video clipping circuit combining the surrounding video signals with past digital signals to adjust its clipping level.

Another object of the invention is to provide digital control signals of various amplitudes, the value of which depends upon the spatial relation between the video signal being clipped and the previous digital feedback signal.

A further object of the invention is to provide an improved video clipping circuit having an adjustable clipping level responsive only to previous digital control signals.

The foregoing and other objects, features and advantages of the invention will be apparent from the following more particular description of a preferred embodiment of the invention, as illustrated in the accompanying drawings.

Figures 1, 2:
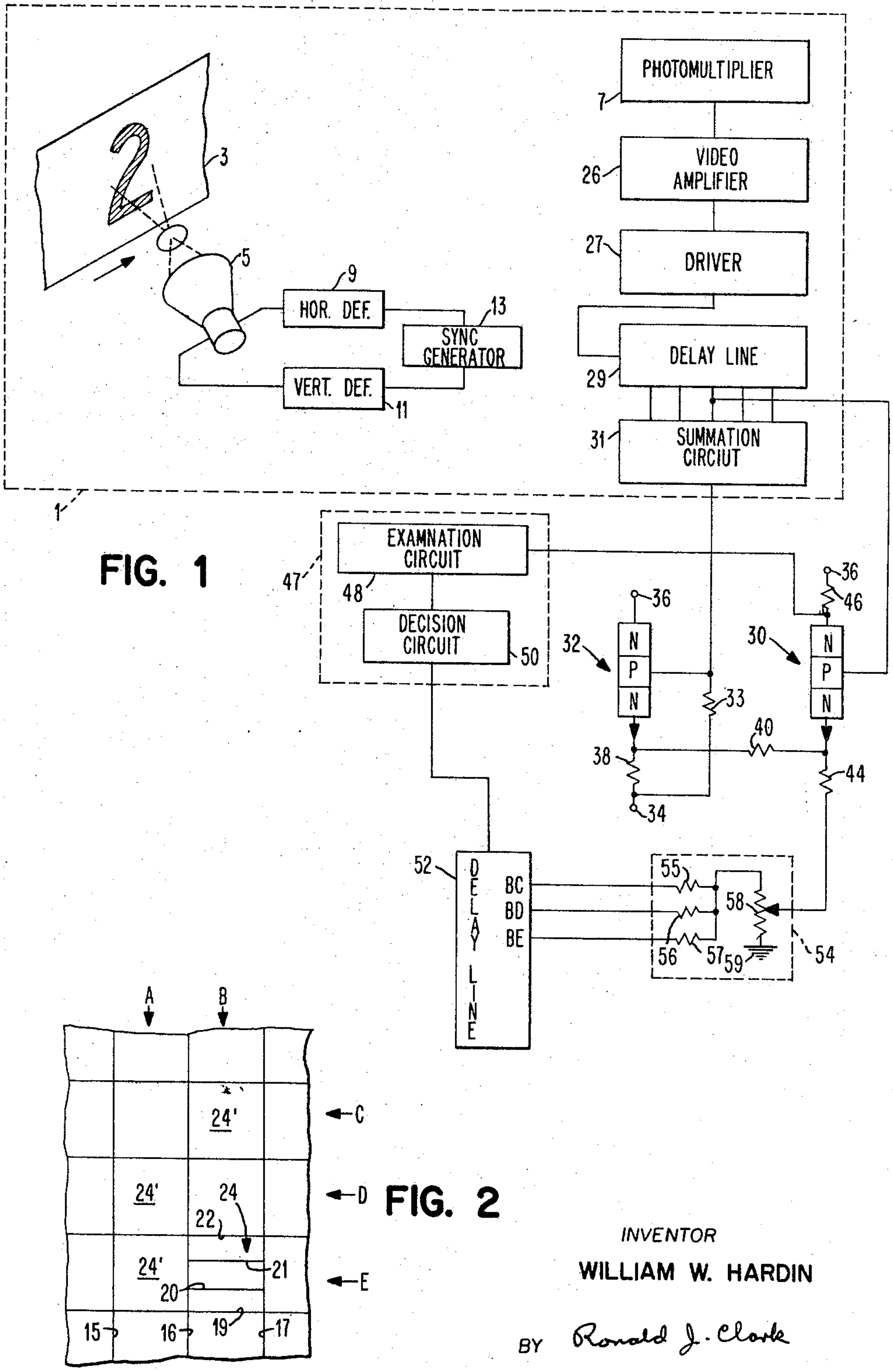
FIG. 1 is a diagrammatic view of the instant invention.
FIG. 2 is a schematic view illustrating the scanning techniques employed with the instant invention and the spatial relationship between the placement of significant previous digital signals and the video signal being clipped.

Briefly, the instant invention contemplates the combination of a video clipping circuit and a data consolidation circuit with a standard video scanning circuit. The consolidation circuit operates to consolidate groups of video signals from the clipping circuit and to generate a single output pulse in response to a plurality of video signals. More specifically, the consolidation circuit examines the video signals for a plurality of decision criteria and applies the results of its examination to a decision circuit which employs logic circuits to decide the black-white nature of the examined video signals. A delay line is employed to store the previous decisions. It is of sufficient length to store decision signals from scanning areas adjacent to the area presently being scanned. Additionally the delay line is equipped with tapped positions for withdrawing its stored information and each position is equipped with an output resistor. Resistive values are assigned to each position depending on the spatial relation between the information stored within the associated delay line position and the area presently being scanned. Each output resistor is connected to a common summing resistor, and the signal developed by the summing resistor is fed back to the clipping circuit and is employed to adjust the clipping level of the video clipping circuit.

Referring to FIG. 1, there is shown a preferred embodiment of an adjustable video clipping circuit. The portion considered to be prior art is enclosed by a dotted line 1. A document 3, having characters to be analyzed, such as the character "2" shown thereon, is moved, by means not shown, past an analyzing or scanning station in the direction shown by the arrow. A flying spot scanner 5 is used to illuminate the document and a photomultiple-tube 7 receives the reflected video signals. The scanning pattern of the scanner 5 is controlled by a horizontal deflection circuit 9 and a vertical deflection circuit 11 operating in synchronism with a synchronizing circuit 13. A character is scanned by a plurality of vertical rasters, each raster being comprised of a plurality of short horizontal scans.

Referring to FIG. 2, there can be seen an example of the scanning pattern employed with the instant invention. Vertical lines 15, 16 and 17 indicate the leading portions of an individual vertical raster and horizontal lines 19, 20, 21 and 22 indicate the limits of a complete horizontal scan between vertical rasters 16 and 17.

The area between a pair of horizontal lines such as 19 and 20 indicates the area scanned by a single horizontal scanning movement. Three horizontal scans have been designated as covering a cell area 24. Additional cells 24' are combined to form vertical columns A and B and horizontal rows C, D and E.

Referring again to FIG. 1, the output of the photomultiplier tube 7 is applied to a video amplifier circuit 26, which increases the signal level of the video signals and applies the amplified video signal to a driver 27. The driver 27 is connected to an analog delay line 29, or in an alternate embodiment of the instant invention the video signal is applied directly to the base lead of the clipping transistor 30. However, such a direct connection requires a low signal to noise ratio.

The delay line 29 is equipped with a plurality of tapped positions and each position is connected to a summation circuit 31 which averages the signals appearing at each position and applies the average signal to the base lead of a level adjust transistor 32. A base biasing resistor 33 is connected between a potential source 34, which source may be at a level of −6 volts, and the base lead of the transistor 32. The collector lead of the transistor 32 is connected to a potential source 36, which may be at +6 volts. The emitter lead of the transistor 32 is connected to the junction of a pair of resistors 38 and 40. The other end of the resistor 38 is connected to the potential source 34, and the other end of the resistor 40 is connected to the emitter lead of the clipping transistor 30 and to one end of a resistor 44. The base lead of the transistor 30 is connected to the center tap position of the delay line 29. The collector lead of the transistor 30 is connected to the potential source 36 by means of a current limiting resistor 46.

The output of the clipping transistor 30 is applied to a consolidation circuit 47 as fully described in my copending application entitled "Data Consolidation System," Ser. No. 341,273, filed Jan. 30, 1964. The consolidation circuit employs an examination circuit 48 and a decision circuit 50, both of which are described in my previously mentioned copending application. The decision circuit 50 applies its output to a digital delay line 52. This output signal from the decision circuit is a series of binary signals wherein a positive level indicates a black scanning response and a more negative level indicates a white scanning response. A suitable delay line 52 is constructed of a plurality of multivibrator stages and is of sufficient length to contain the black-white decisions for the adjoining cells in the previous column adjacent to the column of the cell being scanned. The relative location of the cell being scanned and its adjoining cells in the next preceding column can best be understood with relation to FIG. 2. The cell 24' located in column A row D is designated as being scanned by the flying spot scanner 5. The cells shown in column B have previously undergone the scanning process and a decision as to the nature of the black-white response for the entire cell area has been made. These decisions were stored in the delay line 52 and become available at the delay line taps designated B–C, B–D and B–E, which designation corresponds to the column and row location of the respective cells. The outputs from the taps of the delay line are applied to a digital reference voltage generator 54, which generator comprises a plurality of resistors 55, 56 and 57. Each successive delay line position B–C, B–D and B–E is connected to resistors 55, 56 and 57 respectively. The resistors are terminated in a variable summing resistor 58 having its center tap connected to the other end of the resistor 44, and its other end connected to ground 59. Each of the resistors 55, 56 and 57 is individually weighted corresponding to its relative position with respect to the cell being scanned. More specifically, the resistor 56 associated with the cell B–D immediately to the right of cell A–D undergoing the scanning operation has a lower resistance value and a higher current value than is adjacent resistors 55 and 57. Accordingly, the high current value from the resistor 56 develops a greater voltage drop over the summing resistor 58 than the lower current values from the resistors 55 and 57. The resistor 56 is given its relatively lower resistance value because if the cell immediately to the right had a black response during the scanning process, the clipping level should be raised. The raising of the clipping level does not affect the recognition of an adjacent black area but it does aid in determining the end of a black portion covering a plurality of adjacent cells. More specifically, with the clipping level raised to anticipate a black area, a white condition or a potential black-white condition, or a fuzzy edge condition will be called a white area, thereby giving a definite signal to the remaining portion of the optical recognition system.

In operation, a document to be read is scanned and the reflected video signals are applied to the instant invention in order to differentiate between a video signal representative of a black or character response and one representative of a white or background response. In the case when the video signals are applied directly to the clipping transistor 30, the clipping level is determined by an emitter biasing network similar to the resistors 38, 40 and 44. However, the use of a delay line 29 has been found to improve the clipping operation by averaging out the video signal surrounding the video signal to be clipped as taught by the E. C. Greanias patent previously mentioned.

The transistor 32 is employed to develop a reference voltage for application to the emitter lead of the transistor 30. A portion of this reference voltage is developed through the action of the summation circuit 31, and the application of its summed voltage to the base lead of the transistor 32 thereby causing transistor 32 to conduct and to draw current. The voltage developed over the resistor 40 is applied to the emitter lead of the transistor 30 as the clipping level. Additionally, the currents developed by the weighted resistors 55, 56 and 57 are combined in the resistor 58 and vary the voltage level available to the emitter of the transistor 30, thereby raising or lowering the clipping level applied to the emitter of the transistor 30 in accordance with the binary data contained within the delay line 52.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An adjustable video circuit comprising,
   - an analog delay line having an input circuit to which a plurality of successive video signals is applied,
   - said analog delay line having a plurality of output circuits evenly displaced from said input circuit,
   - a summation circuit connected to said analog delay line output circuits,
   - a trigger circuit having a reference signal connection responsive to said summation circuit, an input signal connection responsive to one of said analog delay line output circuits, and an output signal connection,
   - said trigger circuit producing an output signal whenever said input signal exceeds said reference signal,
   - a data consolidation circuit connected to said trigger output connection,
   - a digital delay line connected to said consolidation circuit and equipped with a plurality of output circuits, and
   - certain of said digital delay line output connections being connected to said trigger circuit reference signal connection.

2. In a pattern recognition system of the type employing a high resolution scanning system to examine each pattern by a plurality of successive incremental areas and a data consolidation circuit for generating a consolidated signal for each of said areas, an adjustable video clipping circuit comprising,
   - an analog delay line having an input circuit to which a plurality of successive video signals is applied,
   - said analog delay line having a plurality of output circuits evenly displaced from said input circuit,
   - a video summation circuit connected to said analog delay line output circuits,
   - a trigger circuit having a reference signal connection responsive to said summation circuit, and an input signal connection responsive to one of said analog delay line output circuits, and an output signal connection, said trigger circuit being connected to said consolidation circuit and producing an output signal whenever said input level exceeds said reference signal level, a digital delay line connected to said consolidation circuit for storing successive consolidation data signals corresponding to successive incremental examination areas, said digital delay line being equipped with a plurality of output circuits for access to the corresponding signals contained within said digital delay line, said output circuits being connected to delay line positions storing consolidated data signals corresponding to digital incremental areas horizontally adjacent to said presently examined area, and said output connections being connected to said trigger circuit reference signal connection.

3. In a pattern recognition system of the type employing a high resolution scanning system to examine each pattern by a plurality of successive incremental areas and a data consolidation circuit for generating a consolidated signal for each of said areas, an adjustable video clipping circuit comprising, an analog delay line having an input circuit to which a plurality of successive video signals is applied, said analog delay line having a plurality of output circuits evenly displaced from said input circuit, a video summation circuit connected to said analog delay line output circuits, a trigger circuit having a reference signal connection responsive to said summation circuit, and an input signal connection responsive to one of said analog delay line output circuits, and an output signal connection, said trigger circuit being connected to said consolidation circuit and producing an output signal whenever said input level exceeds said reference signal level, a digital delay line connected to said consolidation circuit for storing successive consolidation data signals corresponding to successive incremental examination areas, said digital delay line equipped with a plurality of output circuits for giving access to the corresponding signals contained within said delay line, a resistor in each of said output circuits and said resistors being connected to said trigger circuit reference signal connection.

4. In a pattern recognition system of the type employing a high resolution scanning system to examine each pattern by a plurality of successive incremental areas and a data consolidation circuit for generating a consolidated signal for each of said areas, an adjustable video clipping circuit comprising, an analog delay line having an input circuit to which a plurality of successive video signals is applied, said analog delay line having a plurality of output circuits evenly displaced from said input circuit, a video summation circuit connected to said analog delay line output circuits, a trigger circuit having a reference signal connection responsive to said summation circuit, and an input signal connection responsive to one of said analog delay line output circuits, and an output signal connection, said trigger circuit being connected to said consolidation circuit and producing an output signal whenever said input level exceeds said reference signal level, a digital delay line connected to said consolidation circuit for storing successive consolidation data signals corresponding to successive incremental examination areas, said digital delay line being equipped with a plurality of output circuits for giving access to the corresponding signals contained within said delay line, a resistor in each of said output circuits, said resistors having access to said consolidated data signals corresponding to adjacent horizontal scanning areas, and a summing resistor connected between said resistors and said trigger circuit reference signal connection.

5. In a pattern recognition system of the type employing a high resolution scanning system to examine each pattern by a plurality of successive incremental areas and a data consolidation circuit for generating a consolidated signal for each of said areas, an adjustable video clipping circuit comprising, an analog delay line having an input circuit to which a plurality of successive video signals is applied, said analog delay line having a plurality of output circuits evenly displaced from said input circuit, a video summation circuit connected to said analog delay line output circuits, a trigger circuit having a reference signal connection responsive to said summation circuit, and an input signal connection responsive to one of said analog delay line output circuits, and an output signal connection, said trigger circuit being connected to said consolidation circuit and producing an output signal whenever said input level exceeds said reference signal level, a digital delay line connected to said consolidated circuit for storing successive consolidation data signals corresponding to successive incremental examination areas, said digital delay line equipped with a plurality of output circuits for giving access to the corresponding signals contained within said digital delay line, a resistor in each of said output circuits, said resistors having access to said consolidated data signals corresponding to adjacent horizontal scanning areas, a summing resistor connected between said resistors and said trigger circuit reference signal connection, and said resistors being electrically weighted.

6. In a pattern recognition system of the type employing a high resolution scanning system to examine each pattern by a plurality of successive incremental areas an adjustable video clipping circuit comprising a data consolidation circuit for generating consolidated signals for each of the areas, a trigger circuit having a reference signal connection and an input signal connection responsive to reflected video signals and an output signal connection, said trigger circuit being connected to said consolidation circuit and producing an output signal whenever said input signal exceeds said reference signal, a digital delay line connected to said consolidation circuit and equipped with a plurality of output circuits, and certain of said digital delay line output connections being connected to said trigger circuit reference signal connection.

7. In a pattern recognition system of the type employing a high resolution scanning system to examine each pattern by a plurality of successive incremental areas, an adjustable video clipping circuit comprising, a data consolidation circuit for generating a consolidated data signal for each of the areas, a trigger circuit having a reference signal connection, and an input signal connection responsive to reflected video signals, and an output signal connection, said output signal connection being connected to said data consolidation circuit, a digital delay line having a plurality of positions and connected to said consolidation circuit for storing said data signals corresponding to the examination of successive incremental areas, said delay line having resistive output connections for access to selected ones of said delay line positions, said delay line positions storing consolidation signals associated with the scanning areas adjacent the area presently being examined, a summing resistor connected in common to each of said resistive connections, and said summing resistor being connected to said trigger circuit reference signal connection.

8. An adjustable video circuit as recited in claim 7 wherein said resistive connections are electrically weighted for each of said delay line positions corresponding to its spacial relationship with said video signals.

9. In a pattern recognition system of the type employing a high resolution video scanning system to examine each pattern by a plurality of successive incremental areas, an adjustable video clipping circuit comprising, means for generating a signal whenever said video signal exceeds a reference signal, means for consolidating said generated signals for each successive incremental area, means for storing the outputs of said consolidating means, and means for employing said outputs of said consolidating means for prior adjacent scanning areas as the reference signal for said signal generation.

10. In a pattern recognition system of the type employing a high resolution video scanning system to examine each pattern by a plurality of successive incremental areas, an adjustable video clipping circuit comprising, means for generating an output pulse whenever said video signal exceeds a reference level, means for consolidating said pulses for each successive incremental scanning area, means for storing said results of said consolidation, said storing means having a plurality of storage positions and each position being connected to one side of an output resistor, each of said resistors having a different assigned value, and the remaining sides of said resistors being connected together and being connected to said generating means.

References Cited

UNITED STATES PATENTS 3,214,700 10/1965 Hook -------------- 328—147

FOREIGN PATENTS 1,342,180 9/1963 France.

MAYNARD R. WILBUR, *Primary Examiner.*

DARYL W. COOK, J. E. SMITH, J. I. SCHNEIDER, *Assistant Examiners,*